United States Patent
Yamamoto et al.

[11] Patent Number: 6,078,357
[45] Date of Patent: *Jun. 20, 2000

[54] IMAGE MIXING CIRCUIT

[75] Inventors: Yasutoshi Yamamoto, Hirakata; Masayuki Yoneyama, Takatsuki; Masaaki Nakayama, Hirakata; Koichi Toyomura, Katano, all of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/905,395

[22] Filed: Aug. 4, 1997

[30] Foreign Application Priority Data

Aug. 5, 1996 [JP] Japan .................... 8-205661

[51] Int. Cl.$^7$ .............. H04N 9/68; H04N 9/78
[52] U.S. Cl. .............. 348/234; 348/237; 348/668
[58] Field of Search .................. 348/224, 225, 348/234, 235, 236, 237, 238, 362, 229, 663, 668; H04N 9/68, 7/78

[56] References Cited

U.S. PATENT DOCUMENTS

| | | | |
|---|---|---|---|
| 4,825,293 | 4/1989 | Kobayashi et al. | 358/228 |
| 5,162,914 | 11/1992 | Takahashi et al. | 358/213.19 |
| 5,221,963 | 6/1993 | Hashimoto et al. | 358/209 |
| 5,309,243 | 5/1994 | Isai | 348/221 |
| 5,517,242 | 5/1996 | Yamada et al. | |
| 5,633,677 | 5/1997 | Okino et al. | 348/229 |
| 5,638,118 | 6/1997 | Takahashi et al. | |
| 5,801,773 | 9/1998 | Ikeda . | |

FOREIGN PATENT DOCUMENTS

| | | |
|---|---|---|
| 595 299 A2 | 5/1994 | European Pat. Off. |
| 599 570 A1 | 6/1994 | European Pat. Off. |
| 609 592 A1 | 8/1994 | European Pat. Off. |
| 743 787 A2 | 11/1996 | European Pat. Off. |
| 6-269009 | 9/1994 | Japan . |
| 7-131796 | 5/1995 | Japan . |
| 8-289306 | 11/1996 | Japan . |
| 94/18801 | 8/1994 | WIPO . |

Primary Examiner—Wendy Garber
Assistant Examiner—Jacqueline Wilson
Attorney, Agent, or Firm—Wenderoth, Lind & Ponack, L.L.P.

[57] ABSTRACT

An image mixing circuit usable in a video camera for mixing images with a continuous gradation characteristic in both the luminance signal and color signal is provided according to the present invention. A color separation circuit separates plural image signals into plural luminance signal components and plural color signal components. A control signal generation circuit then generates the control signal needed for image synthesis from the plural image signals. A luminance signal mixing circuit and a color signal mixing circuit then separately mix the respective luminance signal components and color signal components according to the control signal.

3 Claims, 16 Drawing Sheets

001E6078357

IMAGE MIXING CIRCUIT

BACKGROUND OF THE INVENTION

1. Field of the Invention

The present invention relates to an image mixing circuit used in such devices as video cameras.

2. Description of the Prior Art

Various image mixing circuits for obtaining an image signal with a wide dynamic range from image signals obtained at different exposure levels have been proposed. One device typical of such image mixing circuits as proposed in Japan Unexamined Patent Publication (kokai) 63-306779 (corresponding to U.S. Pat. No. 5,162,914 and No. 5,638,118 both issued to Koji Takahashi et al.) is described below with reference to FIGS. 15 and 16.

FIG. 15 is a block diagram of the conventional image mixing circuit. As shown in FIG. 15, this image mixing circuit comprises threshold value generators 101a and 101b, comparators 102a and 102b, evaluator 103, and selector 104.

The signal levels of image signals Slong and Sshort generated for images obtained with different exposure levels are compared with separate specific threshold values Th1 and Th2. Mixed image signal Smix is then generated by the selector 104 appropriately selecting image signals Slong and Sshort based on the results of this comparison.

FIG. 16 is a waveform diagram of the image signals Slong, Sshort, and Smix when an image signal containing a color modulation component is generated by a conventional image mixing circuit. The abscissae in FIG. 16 show the pixel position, and the ordinates show the amplitude of the signal wave; image brightness is zero at the origin, and increases to the right.

As shown in FIG. 16, when the image signal selection circuit of this image mixing circuit changes the output signal selection, a discontinuity in the gradation characteristic of the output signal level to the incident light level results at the point at which the output signal selection changes. This is because the synthesized image is generated using image signals from images that have been exposed at different levels.

Discontinuity in the gradation characteristic of the color signal also results when signals containing a color signal superposed on the luminance signal by a single imaging element are mixed.

The color signal hue component also changes when non-linear gradation correction, such as knee correction, is applied to the mixed luminance signal components because the ratio of the luminance signal component to the color signal component is not kept constant.

A non-linear change in the gradation of the luminance signal component also occurs when the signal with the superposed color signal component is saturated, thus resulting in a change in hue. When the amount of the per-line color modulation component also changes due to the arrangement of the color filters used with the imaging element, a difference in the luminance signal level also occurs between lines.

Furthermore, when signal levels are matched by adjusting the gain of image signals generated at different exposure levels as a means of achieving a continuous gradation characteristic, the signal-to-noise ratio in high luminance areas of the signal deteriorates according to the exposure ratio of the signals.

SUMMARY OF THE INVENTION

The object of the present invention is therefore to achieve a solution to the above-mentioned problems by providing an image mixing circuit for mixing plural images containing a color signal component and a luminance signal component obtained at different exposure levels whereby the reproducible gradation of the respective signal components is continuous.

To achieve the above object, an image mixing circuit according to the present invention comprises a color separation circuit for separating plural image signals of different exposure levels generated by and input from an imaging device into plural luminance signal components and plural color signal components, a control signal generation circuit for generating the control signal necessary for image mixing from the plural image signals, a luminance signal mixing circuit for mixing the plural luminance signal components according to the control signal, and a color signal mixing circuit for mixing the plural color signal components according to the control signal. A continuous gradation characteristic in the luminance signal component and the color signal component is achieved by separating the plural image signals into plural luminance signal components and plural color signal components, generating the control signal needed for image mixing from the plural image signals, and then separately mixing the plural luminance signal components and color signal components according to the control signal.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of an image mixing circuit according to the present invention are described below with reference to the accompanying figures.

Embodiment 1

The object of the first embodiment of the present invention is to apply an image signal mixing process suitable for the luminance signal components and color signal components of plural image signals to achieve a continuous gradation characteristic. This is achieved by separating the plural image signals into plural luminance signal components and plural color signal components, generating the control signal needed for image mixing from the plural image signals, and then separately mixing the plural luminance signal components and color signal components according to the control signal.

Figure 1:
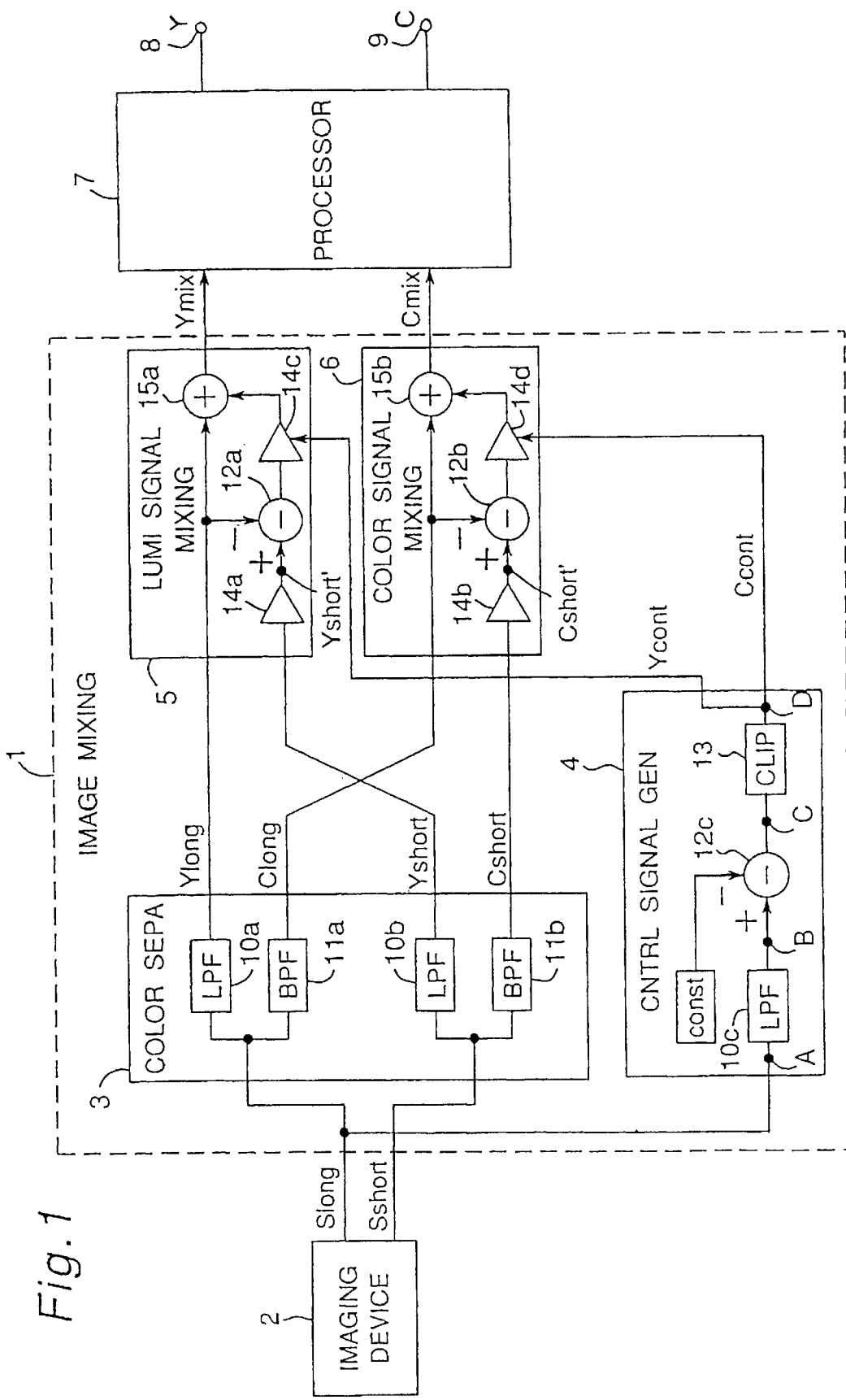
FIG. 1 is a block diagram of the basic construction of an image mixing circuit according to the first embodiment of the present invention.
Figure 2A:
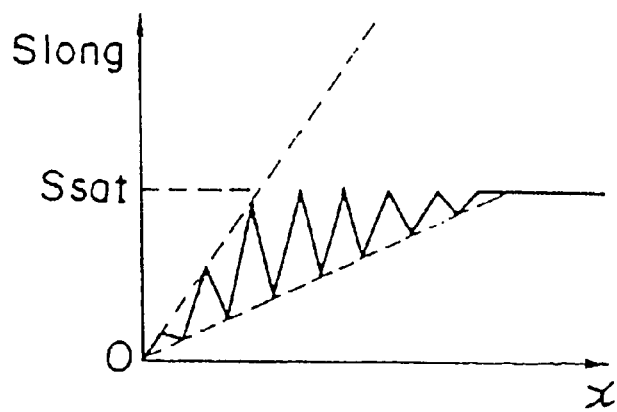
FIG. 2 is a waveform diagram of the signal waves at various points in the control signal generation circuit of the image mixing circuit of the first embodiment of the invention.
Figure 2B:
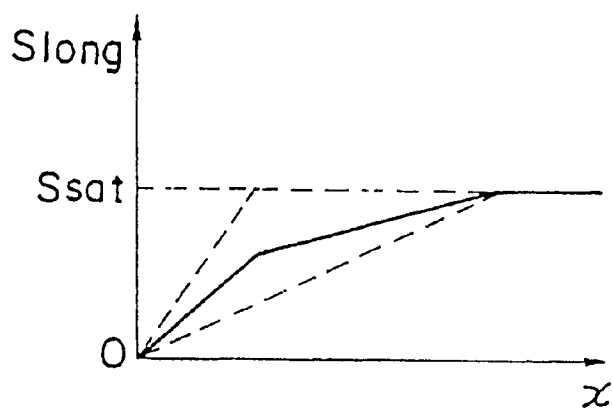
Figure 2C:
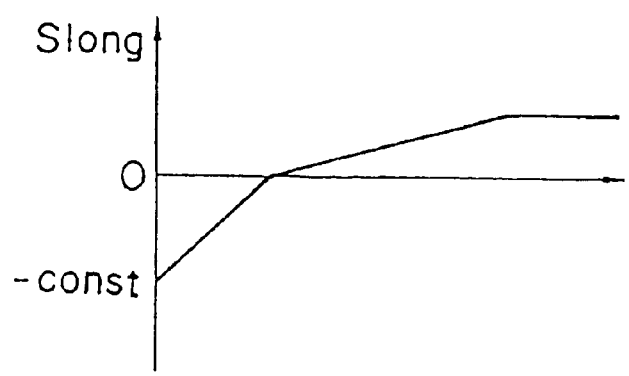
Figure 2D:
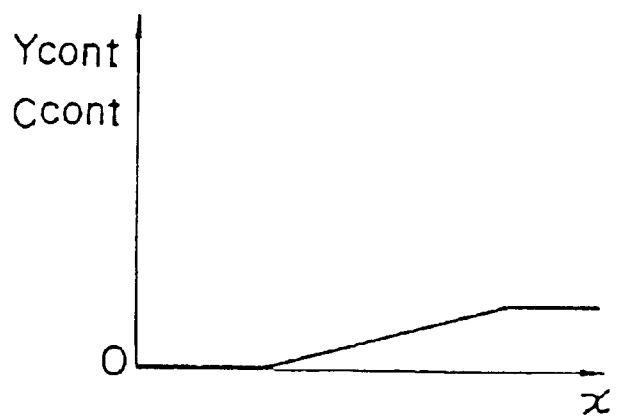
Figure 3A:
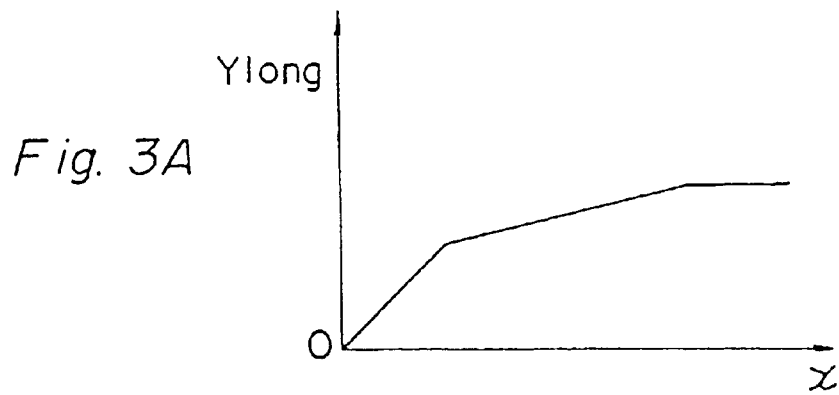
FIG. 3 is a waveform diagram of the luminance signal components at various points in the image mixing circuit of the first embodiment of the invention.
Figure 3B:
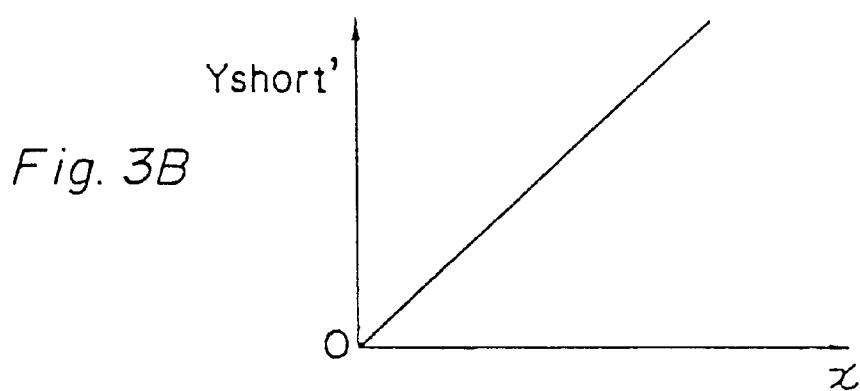
Figure 3C:
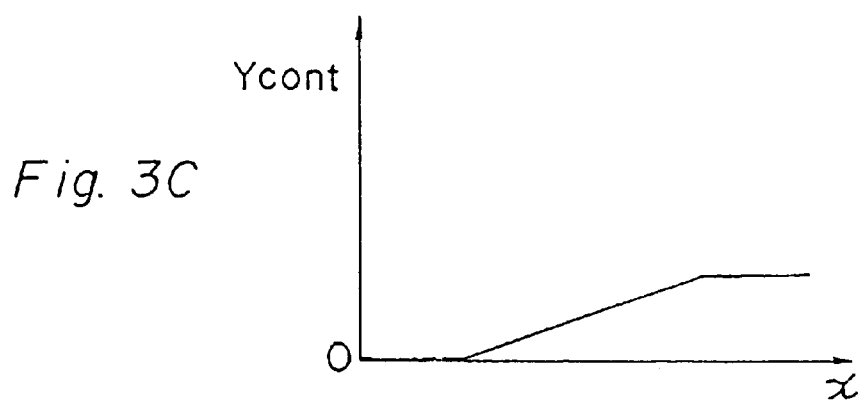
Figure 3D:
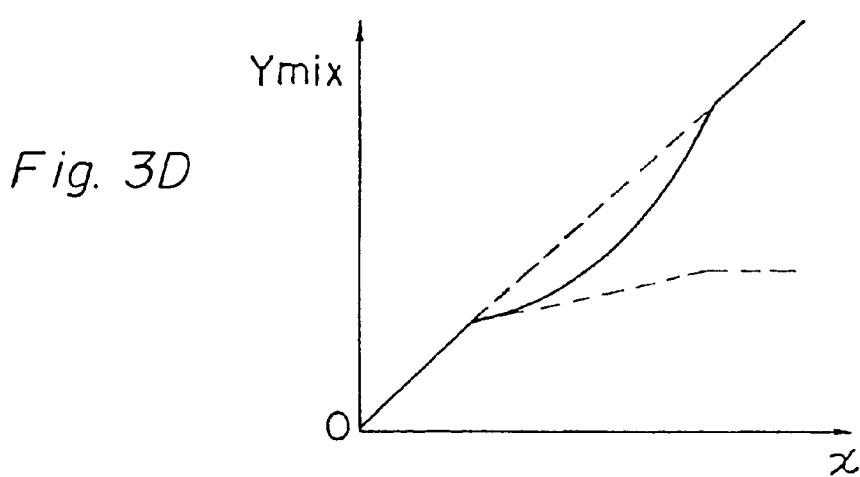
Figure 4A:
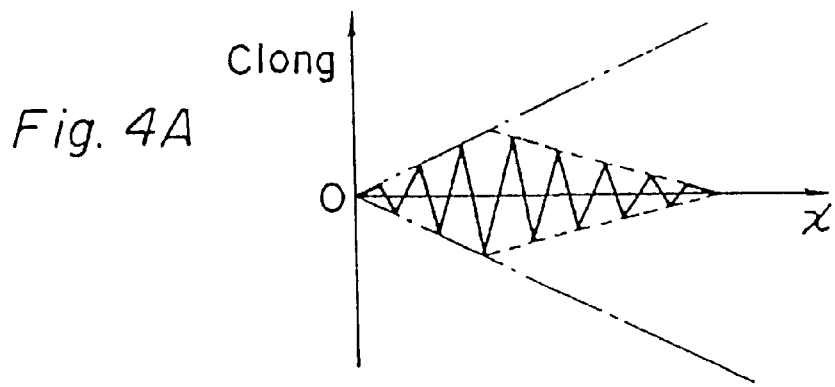
FIG. 4 is a waveform diagram of the color signal components at various points in the image mixing circuit of the first embodiment of the invention.
Figure 4B:
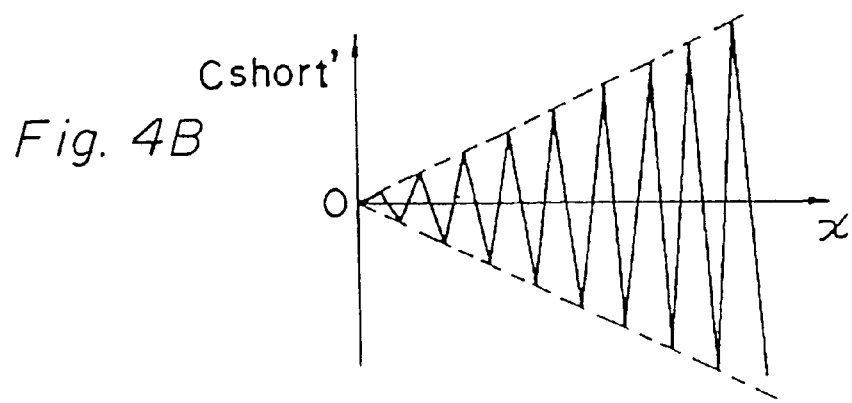
Figure 4C:
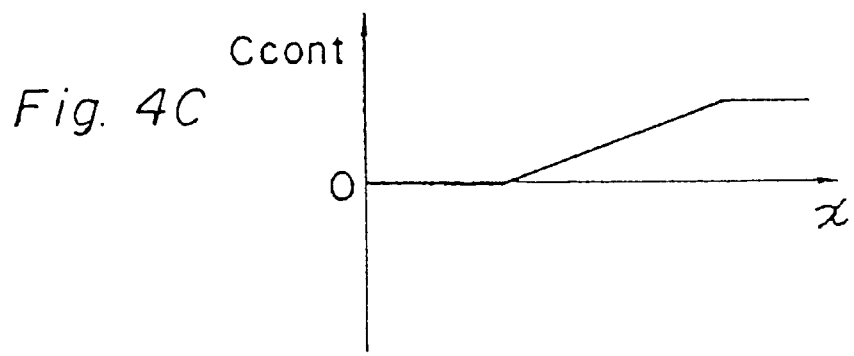
Figure 4D:
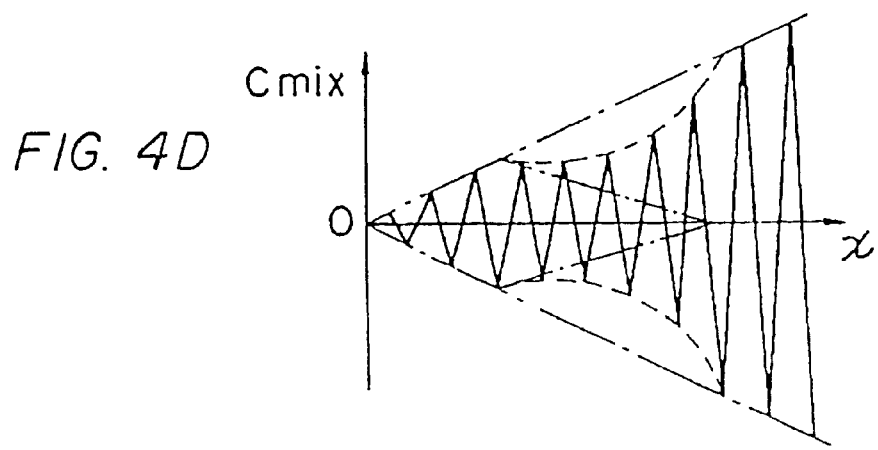

FIG. 1 is a block diagram of the basic construction of an image mixing circuit according to the first embodiment of the present invention. As shown in FIG. 1, this image mixing circuit 1 comprises an imaging device 2, color separation circuit 3, control signal generation circuit 4, luminance signal mixing circuit 5, color signal mixing circuit 6, signal processor 7, luminance signal output terminal 8, color signal output terminal 9, low pass filters (LPF) 10a to 10c, bandpass filters 11a and 11b, subtracters 12a to 12c, clipping circuit 13, amplifiers 14a to 14d, and adders 15a and 15b.

Two image signals Slong and Sshort generated at different exposure levels are output from the imaging device 2. The imaging device 2 operates by driving a single imaging element having a two-dimensional array of picture elements with color filters of different spectral characteristics at twice the normal frequency to image two frames in the normal single frame imaging period. An electronic shutter is operated to reduce the exposure of one frame, and two image signals captured at different exposure levels are obtained by adjusting the signal output timing by means of time-base compensation using a field memory. These two image signals are output in the format of a color signal component superposed on a luminance signal component by the arrangement and spectral characteristics of the color filters used on a common imaging element. Imaging elements of this type are used in consumer video cameras. A detail of the imaging device 2 is disclosed in U.S. Pat. No. 5,162,914 and No. 5,638,118 both issued to Koji Takahashi et al., which are herein enclosed by reference.

The image mixing circuit 1 first inputs the long-exposure image signal Slong and the short-exposure image signal Sshort output from the imaging device 2 to the color separation circuit 3.

The color separation circuit 3 passes the long-exposure image signal Slong through LPF 10a to obtain a long-exposure luminance component Ylong, and through bandpass filter 11a to obtain a long-exposure color component Clong. The short-exposure image signal Sshort is likewise passed through LPF 10b to obtain a short-exposure luminance component Yshort, and through a bandpass filter 11b to obtain a short-exposure color component Cshort.

The long-exposure image signal Slong (A) is also input to the control signal generation circuit 4 where the modulation component is removed by a LPF 10c. A constant const is then subtracted from the LPF output (B) by a subtracter 12c, and the result (C) is then clipped by the clipping circuit 13 to obtain control signals Ycont and Ccont (D). The change in the waveform of the long-exposure image signal Slong at points A, B, C, and D in FIG. 1 as it is processed by the control signal generation circuit 4 is shown in FIG. 2.

The abscissae in FIG. 2 show the pixel position and the ordinates show the amplitude of the signal wave, wherein image brightness is zero at the origin, and increases to the right. As a result of this signal processing operation, the control signal generation circuit 4 generates a control signal that varies according to the luminance signal component level of the long-exposure image signal Slong when the luminance signal component exceeds a constant const, and that is constant when the image signal Slong is saturated.

Both short-exposure luminance component Yshort and long-exposure luminance component Ylong are input to the luminance signal mixing circuit 5 where an amplifier 14a boosts Yshort to the same signal level as Ylong. The resulting Yshort' is then applied to a subtracter 12a. The subtracter 12a removes Ylong from Yshort', and the result is then amplified by another amplifier 14c according to the control signal Ycont. Next, this amplified output is combined by an adder 15a with the long-exposure luminance component Ylong to obtain the mixed luminance signal component Ymix.

Note that the relationship between Ylong, Yshort', Ycont, and Ymix can be expressed by the following equation:

$$Ymix = Yshort'*Ycont + Ylong*(1-Ycont)$$

thus, $$Ymix = Ylong + (Yshort'-Ylong)*Ycont.$$

Because of the characteristics of Ycont, the weight of Yshort' on Ymix increases as the level of the long-exposure luminance component Ylong rises, and when Ylong is saturated, Ymix is completely replaced by Yshort'. The relationship between the waveforms of Ylong, Yshort', Ycont, and Ymix in the luminance signal mixing circuit 5 are shown in FIG. 3. It should be noted that Ymix varies continuously as shown in FIG. 3.

The operation of the color signal mixing circuit 6 is identical to that of the luminance signal mixing circuit 5, except that the color signal is the modulation component in the color signal mixing circuit 6. Further description thereof is thus omitted below. The relationship between the waveforms of the corresponding Clong, Cshort', Ccont, and Cmix signals is shown in FIG. 4. The envelope of the color signal modulation component in FIG. 4 is indicated by the dotted line. Note that the envelope of the Cmix signal is also continuous.

The signal processor 7 then applies signal processing operations, such as gamma correction, aperture correction, white balance control, and matrix processing, normally used in video cameras to the processed luminance signal Ymix and color signal Cmix to generate the luminance signal Y and color signal C output from the luminance signal output terminal 8 and color signal output terminal 9, respectively.

It is therefore possible by means of this first embodiment of an image mixing circuit according to the present invention to separate the plural image signals into plural luminance signal components and plural color signal components, to generate the control signal needed for image mixing from the plural image signals, and then separately mix the plural luminance signal components and color signal components according to the control signal to achieve continuous gradation in the luminance signal component and color signal component of the synthesized image signal.

Embodiment 2

An image mixing circuit according to a second embodiment of the invention is described next below with reference to the accompanying figures.

The object of the second embodiment of the present invention is to apply an image signal mixing process achieving a continuous gradation characteristic in the color signal component even when gradation correction is applied to the luminance signal. This is achieved by normalizing the color signal component based on the luminance signal component in the color separation circuit, and then weighting the color signal component according to the luminance signal after the mixing process of the color signal mixing circuit is completed.

Figure 5:
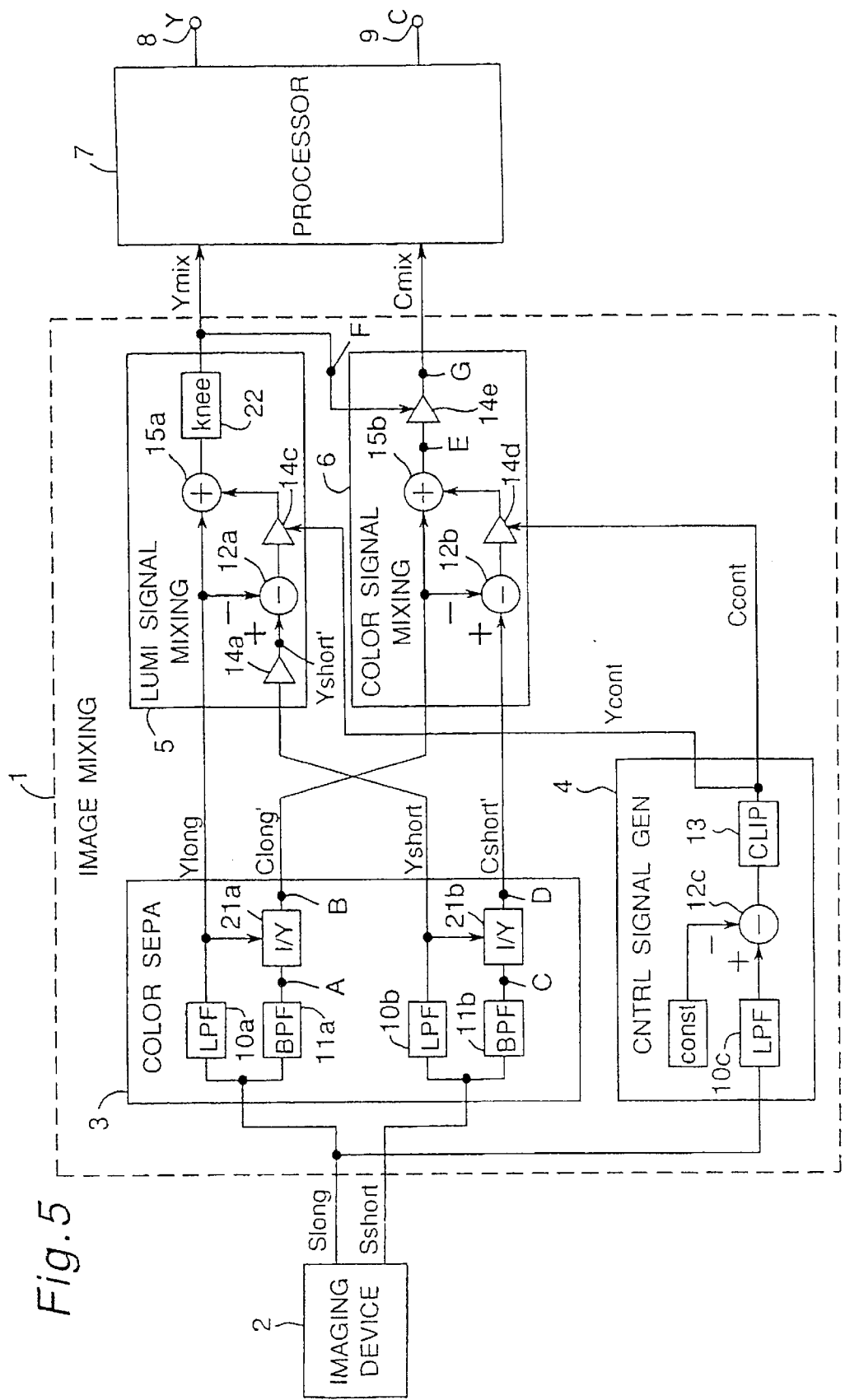
FIG. 5 is a block diagram of the basic construction of an image mixing circuit according to the second embodiment of the present invention.
Figure 6A:
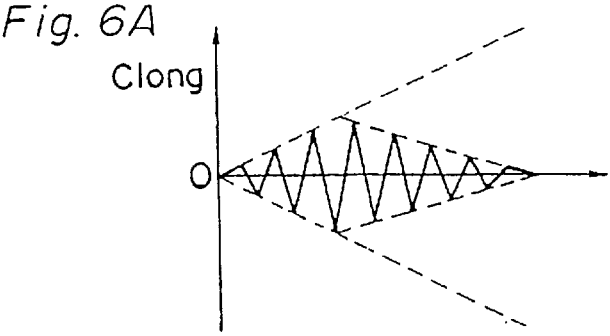
FIG. 6 is a waveform diagram of the color signal components at various points in the image mixing circuit of the second embodiment of the invention.
Figure 6E:
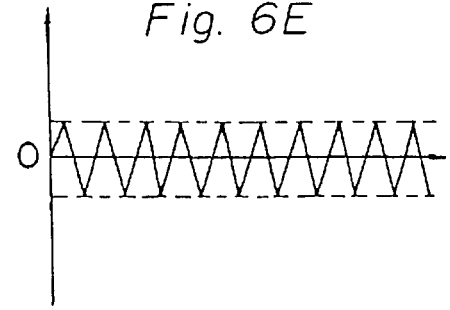
Figure 6B:
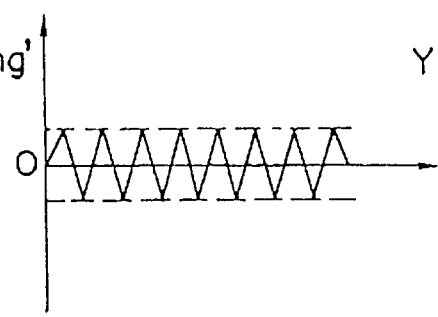
Figure 6F:
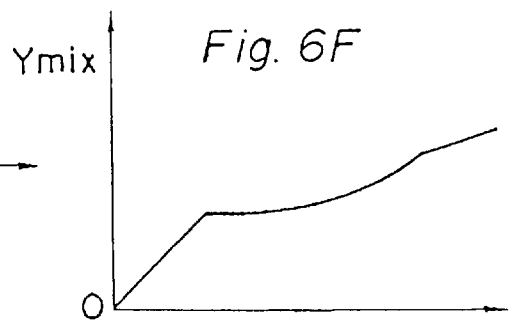
Figure 6C:
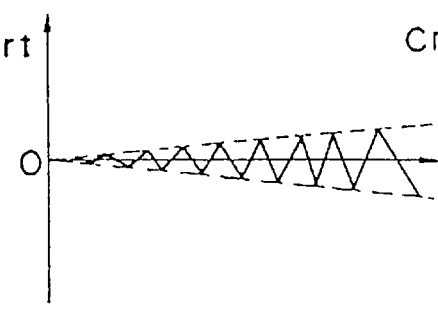
Figure 6G:
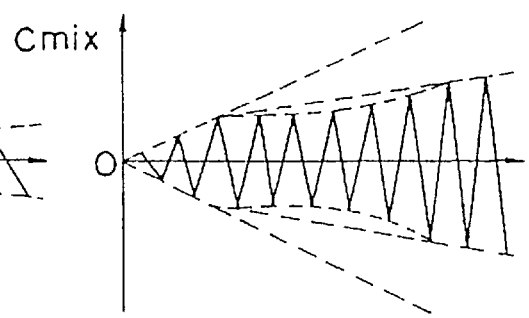
Figure 6D:
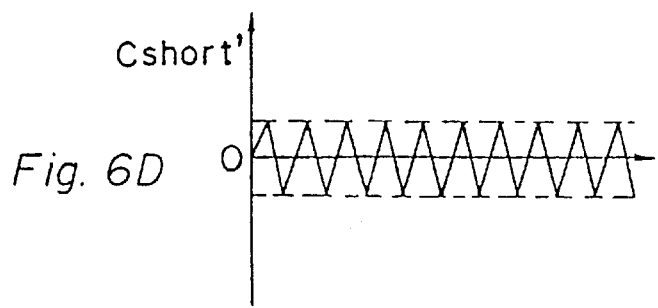

FIG. 5 is a block diagram of an image mixing circuit according to the second embodiment of the present invention. As shown in FIG. 5, this image mixing circuit 1 is essentially the same as that of the first embodiment, but further comprises normalization circuits 21a and 21b, and a gradation correction circuit 22.

Two image signals Slong and Sshort generated at different exposure levels are output from the imaging device 2. The image mixing circuit 1 then inputs the long-exposure image signal Slong and the short-exposure image signal Sshort output from the imaging device 2 to the color separation circuit 3.

The color separation circuit 3 passes the long-exposure image signal Slong and the short-exposure image signal Sshort through LPF 10a and 10b, and through bandpass filter 11a and 11b, to obtain long-exposure luminance component Ylong and long-exposure color component Clong, and short-exposure luminance component Yshort and short-exposure color component Cshort.

The color signals are then normalized based on the luminance signal by the normalization circuits 21a and 21b of the color separation circuit 3 to obtain the normalized color signals Clong' and Cshort'. These normalized color signals have equal amplitude when the color signal is the same as a result of this normalization process.

The operations of the control signal generation circuit 4 and the luminance signal mixing circuit 5 are the same as in the first embodiment above, and further description is therefore omitted.

After the luminance signal mixing circuit 5 mixes the long-exposure luminance component Ylong and the short-exposure luminance component Yshort as described in the first embodiment, a non-linear correction of the gradation characteristic is applied by gradation correction circuit 22 to output the mixed luminance signal Ymix.

After completing the same signal processing operation described in the first embodiment above, an amplifier 14e in the color signal mixing circuit 6 adjusts the gain of the processed color signal according to the output signal Ymix of the luminance signal mixing circuit 5 to generate the mixed color signal Cmix. In other words, the amplifier 14e serves as a weighting circuit for weighting the color signal according to the luminance signal Ymix after the color signal mixing operation is completed.

The waveform of the mixed luminance signal Ymix (point F) used to adjust the color signal gain, and the change in the waveform of the color signals as they are processed and output, shown at points A through E and G in FIG. 5, are shown in FIG. 6. Note that the envelope of the color signal Cmix in FIG. 6 changes continuously with a waveform matching the signal level of the luminance signal Ymix. The ratio between the luminance signal Ymix and the color signal Cmix thus remains constant, resulting in a continuous color signal gradation characteristic and a constant color signal hue.

As in the first embodiment, the signal processor 7 then applies normal video camera signal processing operations to the mixed luminance signal Ymix and color signal Cmix, and thus generates the luminance signal Y and color signal C output from the luminance signal output terminal 8 and color signal output terminal 9, respectively.

It is therefore possible by means of this second embodiment of an image mixing circuit according to the present invention to achieve a continuous gradation characteristic in the color signal component without a change in hue even when gradation correction is applied to the luminance signal by normalizing the color signal component based on the luminance signal component in the color separation circuit, and then weighting the color signal component according to the luminance signal after the mixing process of the color signal mixing circuit is completed.

Embodiment 3

An image mixing circuit according to a third embodiment of the invention is described next below with reference to the accompanying figures.

The object of the third embodiment of the present invention is to apply an image signal mixing process whereby interline differences in the luminance signal level are suppressed, and a continuous gradation characteristic in the color signal component is achieved. This is achieved by the control signal generation circuit generating a color signal using the signal with the highest luminance level selected from the signals with a superposed color signal component in the vicinity of a particular target pixel.

Figure 7:
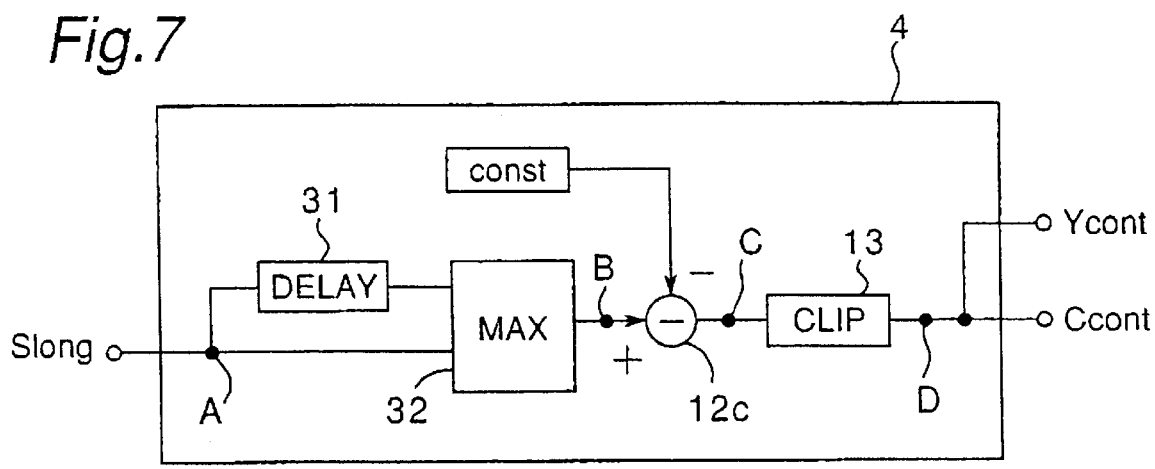
FIG. 7 is a block diagram of the control signal generation circuit of an image mixing circuit according to the third embodiment of the present invention.
Figure 8A:
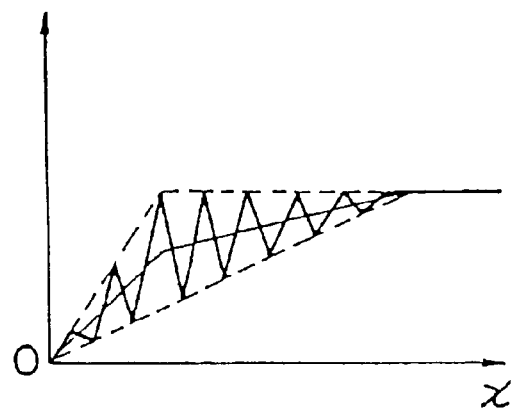
FIG. 8 is a waveform diagram of the signal waves at various points in the control signal generation circuit of the image mixing circuit of the third embodiment of the invention.
Figure 8B:
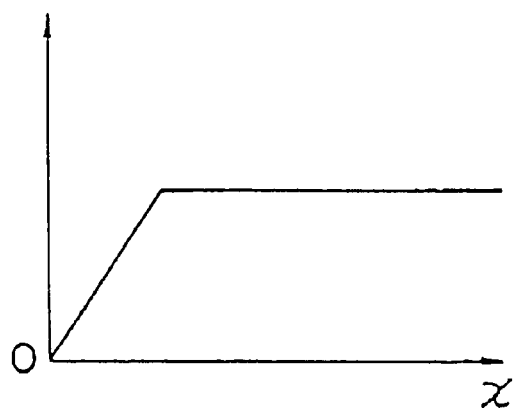
Figure 8C:
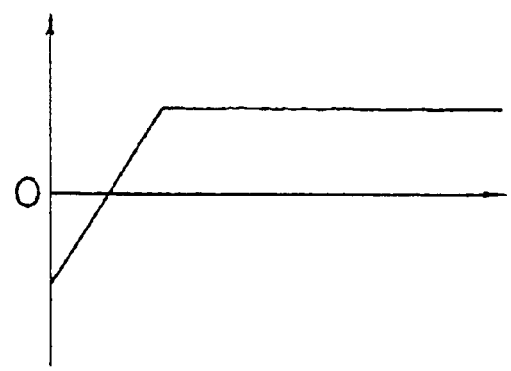
Figure 8D:
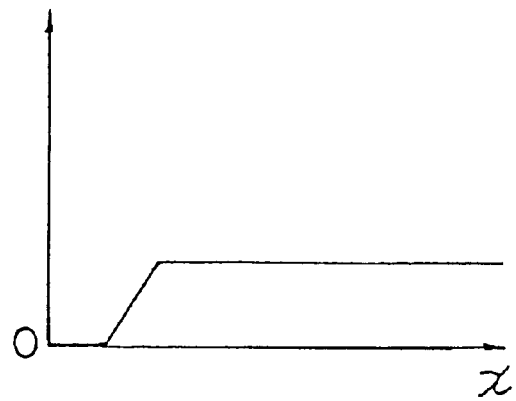
Figure 9A:
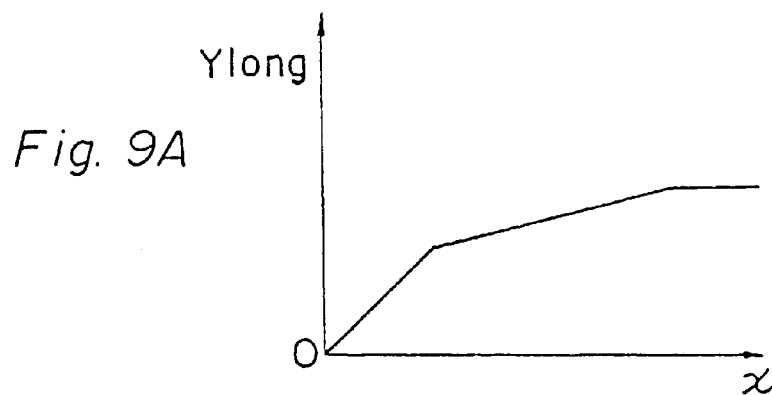
FIG. 9 is a waveform diagram of the luminance signal components at various points in the image mixing circuit of the third embodiment of the invention.
Figure 9B:
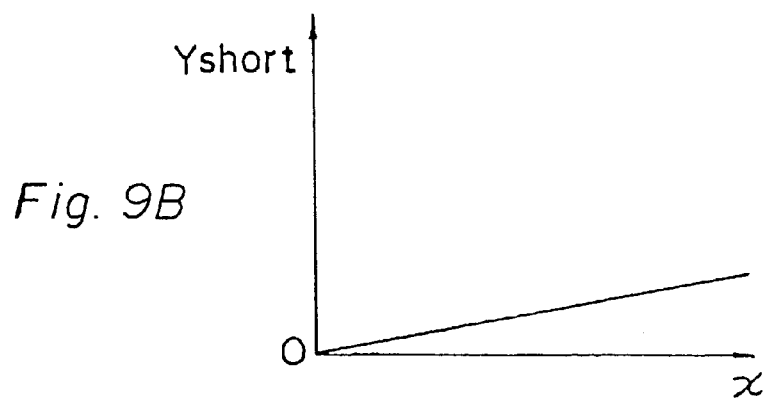
Figure 9C:
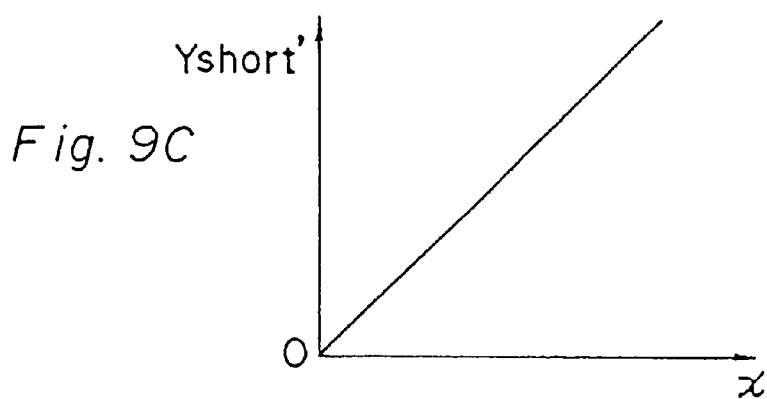
Figure 9D:
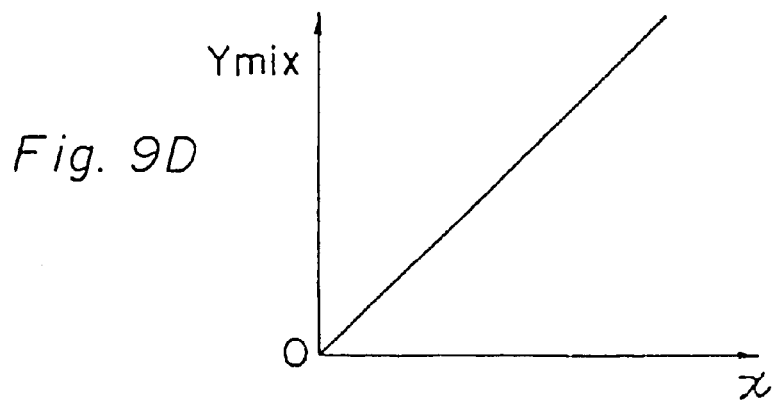
Figure 10A:
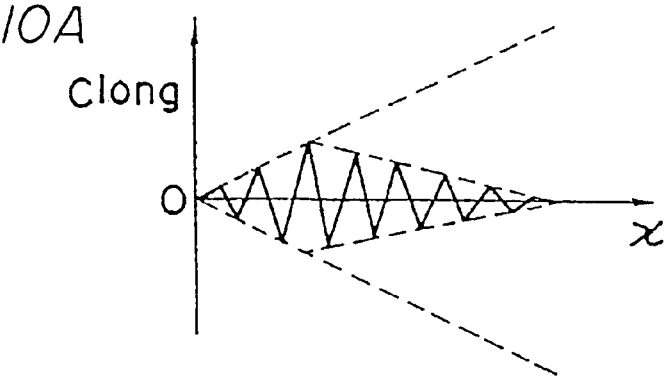
FIG. 10 is a waveform diagram of the color signal components at various points in the image mixing circuit of the third embodiment of the invention.
Figure 10B:
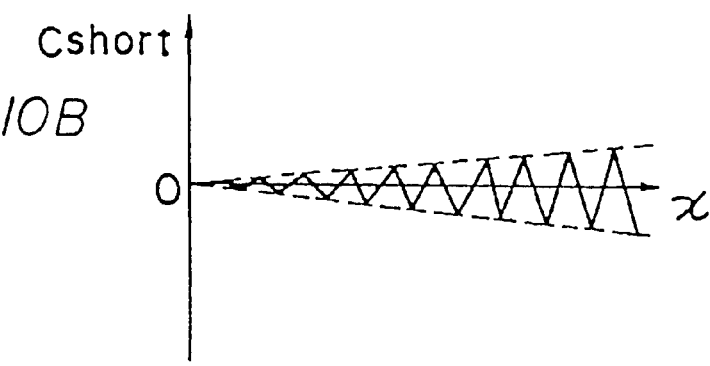
Figure 10C:
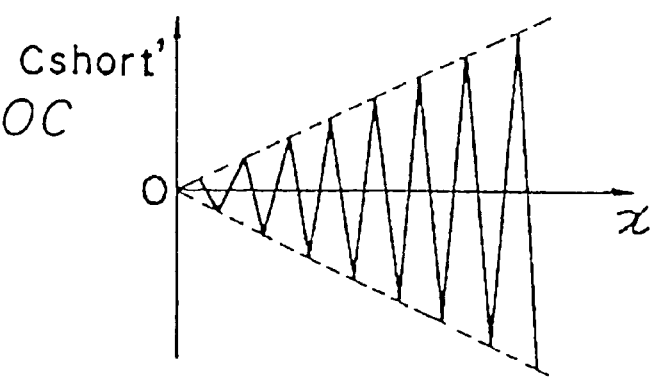
Figure 10D:
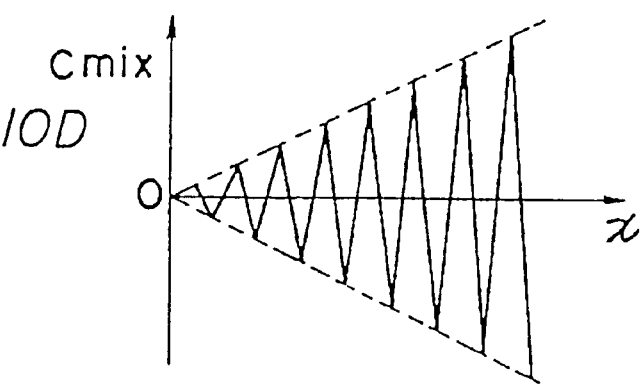

FIG. 7 is a block diagram of the control signal generation circuit 4 in an image mixing circuit according to the third embodiment of the present invention. As shown in FIG. 7, this control signal generation circuit 4 comprises a delay circuit 31 and a maximum value selector 32.

The construction and operation of the components of the image mixing circuit according to this third embodiment are identical to those of the first embodiment described above with the exception of the control signal generation circuit 4. Further description thereof is thus omitted below.

The long-exposure image signal Slong is input to the control signal generation circuit 4 to the delay circuit 31 and to the maximum value selector 32. The delay circuit 31 delays the input signal one pixel. The maximum value selector 32 then compares the delayed signal with the current input signal to select the signal (B in FIG. 7) with the higher signal level. The subtracter 12c then subtracts the constant const from the output (B) of the maximum value selector 32, and the result (C) is then clipped by the clipping circuit 13 to obtain control signals Ycont and Ccont (D). The change in the waveform of the long-exposure image signal Slong at points A, B, C, and D in FIG. 7 as it is processed by the control signal generation circuit 4 is shown in FIG. 8.

The abscissae in FIG. 8 show the pixel positions (and the ordinates show the amplitude of the signal wave, wherein image brightness is zero at the origin, and increases to the right. As a result of this signal processing operation, the control signal generation circuit 4 generates a control signal that varies according to the luminance signal component level of the long-exposure image signal Slong containing a modulation component when the luminance signal component exceeds a constant const, and that is constant when the higher luminance level image signal Slong containing a modulation component is saturated.

The waveforms of the Ylong, Yshort, Yshort' and Ymix signals are shown in FIG. 9, and the waveforms of the Clong, Cshort, Cshort', and Cmix signals are shown in FIG. 10.

The luminance signal level is affected by saturation of the color modulation component. Depending on the arrangement of the color filters of the imaging element, this can produce a line-by-line difference in the luminance level. This interline difference in the luminance level is prevented by the image mixing circuit according to the present embodiment, however, because the image signal mixing process is accomplished before saturation of the color modulation component.

It is therefore possible by means of this third embodiment of an image mixing circuit according to the present invention to apply an image signal mixing process whereby a continuous gradation characteristic in the color signal component and the luminance signal component is achieved while suppressing interline differences in the luminance signal level. This is achieved by the control signal generation circuit generating a color signal using the signal with the highest luminance level selected from the signals with a superposed color signal component in the vicinity of a particular target pixel.

It should be noted that the delay period imposed by the delay circuit 31 of the present embodiment is described as being one pixel, but the invention shall not be so limited. Specifically, by disposing plural delay circuits with one delay circuit imposing a one-line delay, interline differences in the luminance signal level can be completely suppressed because line by line differences in the control signal level based on a per-line difference in the color modulation component can be eliminated.

Embodiment 4

An image mixing circuit according to a fourth embodiment of the invention is described next below with reference to the accompanying figures.

The object of the fourth embodiment of the present invention is to apply an image signal mixing process whereby a continuous gradation characteristic in the luminance signal component is achieved, and signal-to-noise ratio degradation is small, by generating one of the signals used for the luminance signal mixing operation of the luminance signal mixing circuit by simply adding plural signals with different exposure levels.

Figure 11:
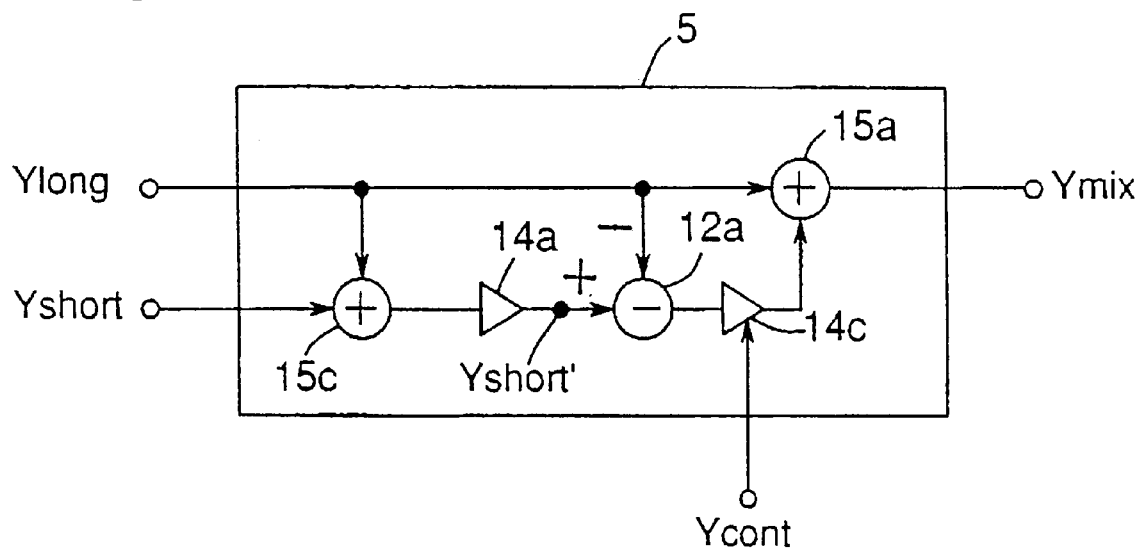
FIG. 11 is a block diagram of the luminance signal mixing circuit of an image mixing circuit according to the fourth embodiment of the present invention.
Figure 12A:
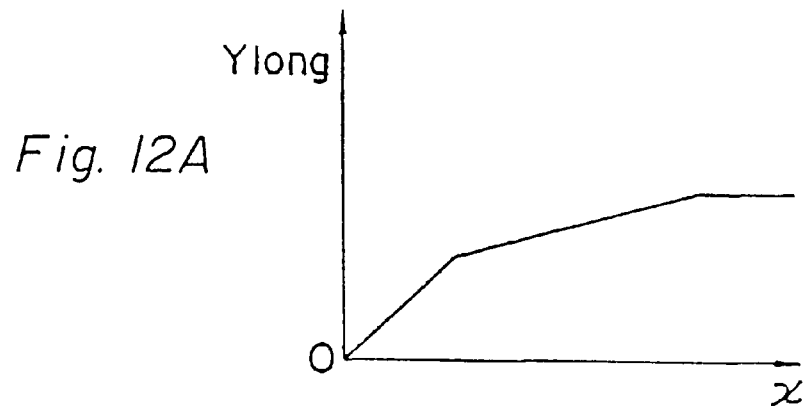
FIG. 12 is a waveform diagram of the luminance signal components at various points in the image mixing circuit of the fourth embodiment of the invention.
Figure 12B:
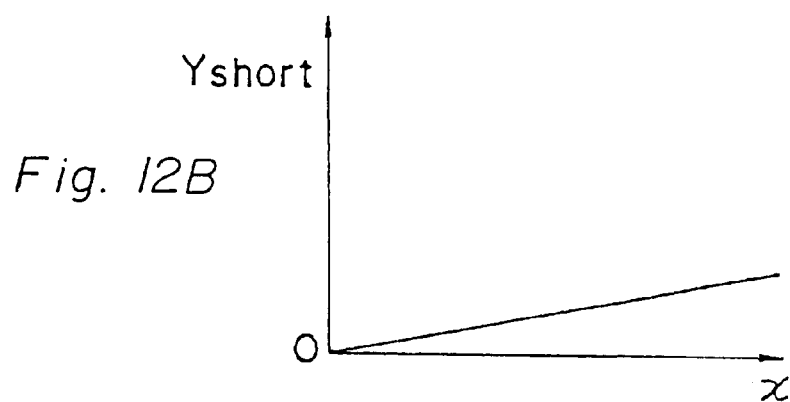
Figure 12C:
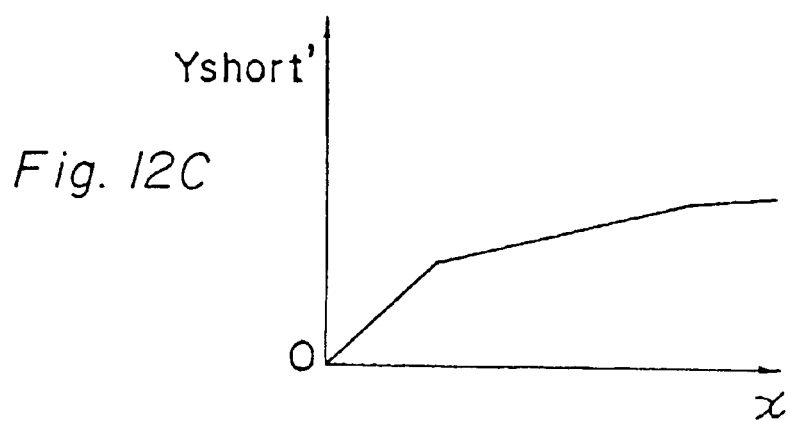
Figure 12D:
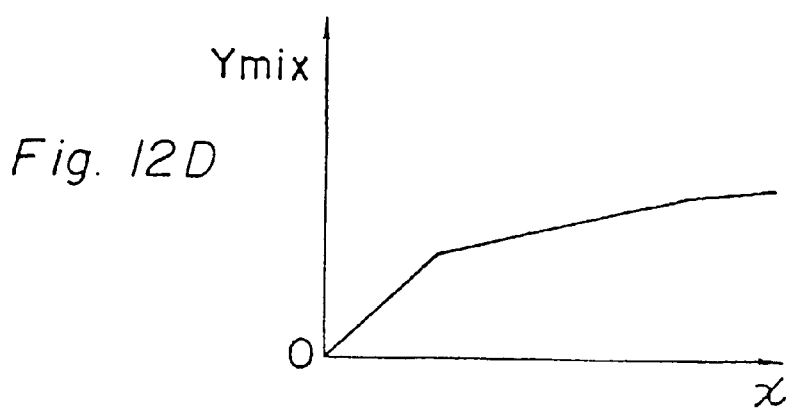

FIG. 11 is a block diagram of the luminance signal mixing circuit 5 in an image mixing circuit according to the fourth embodiment of the present invention.

The construction and operation of the components of the image mixing circuit according to this fourth embodiment are identical to those of the second embodiment described above with the exception of the luminance signal mixing circuit 5. Further description thereof is thus omitted below.

The long-exposure luminance component Ylong and short-exposure luminance component Yshort are added by adder 15c of the luminance signal mixing circuit 5, and the gain is then adjusted by amplifier 14a to obtain Yshort'. Subsequent operation is identical to that of the luminance signal mixing circuit 5 in the first embodiment above.

The waveforms of Ylong, Yshort, Yshort', and Ymix in this embodiment are shown in FIG. 12.

When the signal Yshort' for high luminance image areas is obtained by gain control as in the luminance signal mixing circuit 5 of the third embodiment, the gain of the short-exposure luminance signal must be adjusted to the exposure ratio. The required gain can be minimized in this case, and the S/N ratio deterioration therefore suppressed, by obtaining the signal Yshort' for high luminance image areas by adding the long-exposure luminance component Ylong and the short-exposure luminance component Yshort as in the present embodiment.

It is therefore possible by means of this fourth embodiment of an image mixing circuit according to the present invention to apply an image signal mixing process whereby a continuous gradation characteristic in the luminance signal is component is achieved, and the signal-to-noise ratio degradation is small, by generating one of the signals used for the luminance signal mixing operation of the luminance signal mixing circuit by simply adding plural signals with different exposure levels.

Embodiment 5

An image mixing circuit according to a fifth embodiment of the invention is described next below with reference to the accompanying figures.

The object of the fifth embodiment of the present invention is to apply an image signal mixing process whereby a continuous gradation characteristic in the luminance signal component is achieved, and the signal-to-noise ratio degradation is small, by generating one of the signals used for the luminance signal mixing operation of the luminance signal mixing circuit by adding an offset value to plural signals with different exposure levels.

Figure 13:
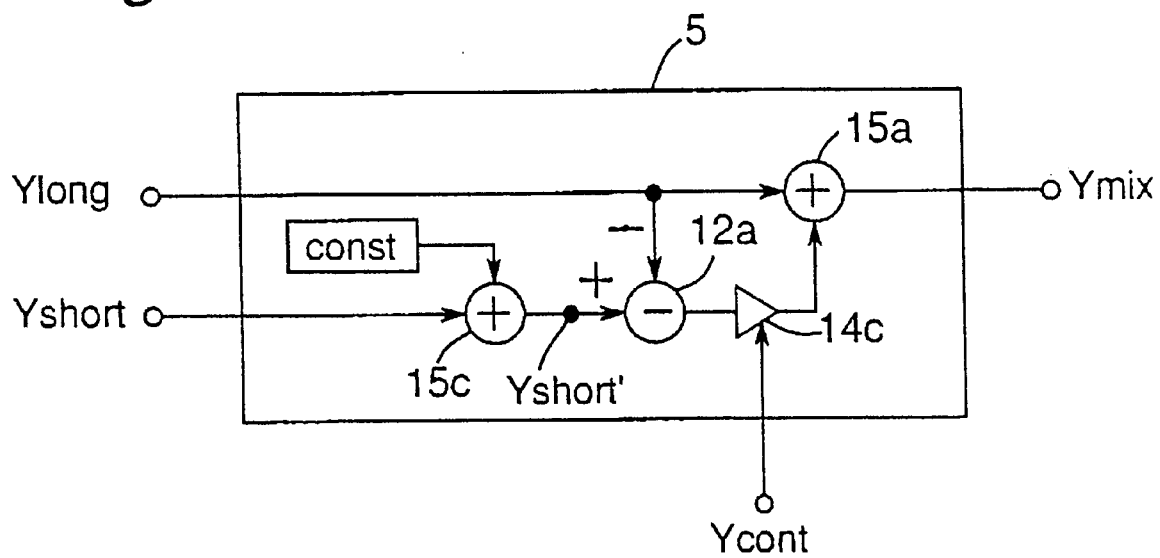
FIG. 13 is a block diagram of the luminance signal mixing circuit of an image mixing circuit according to the fifth embodiment of the present invention.
Figure 14A:
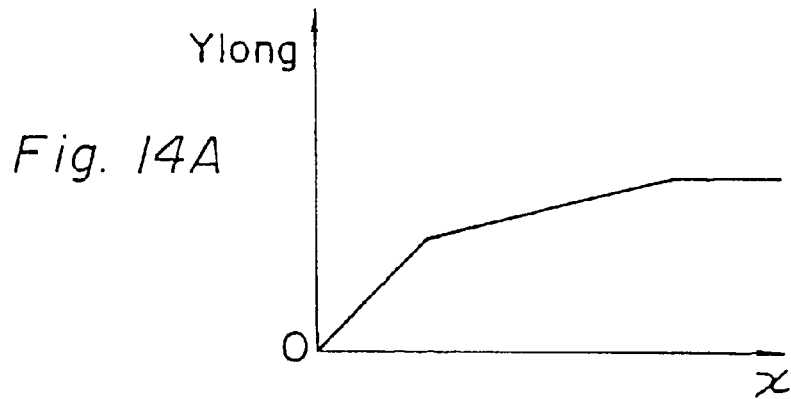
FIG. 14 is a waveform diagram of the luminance signal components at various points in the image mixing circuit of the fifth embodiment of the invention.
Figure 14B:
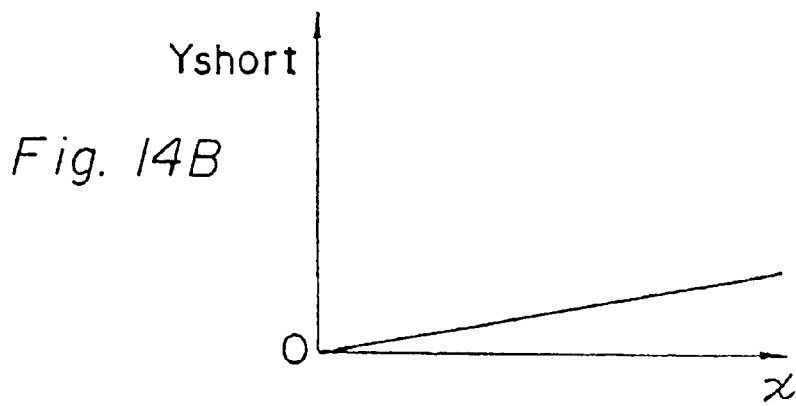
Figure 14C:
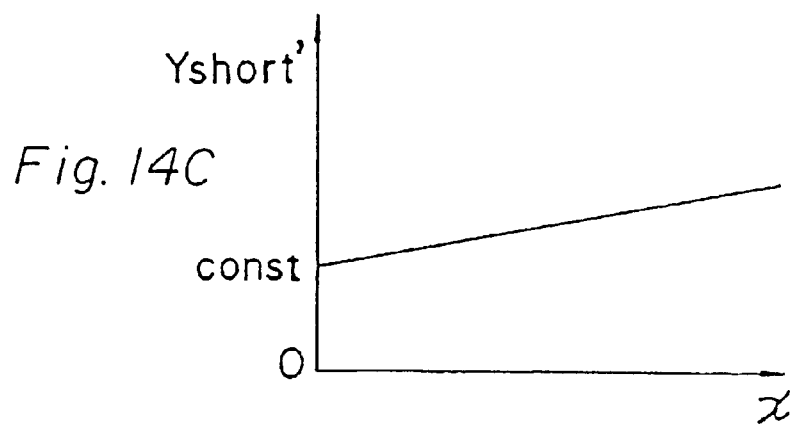
Figure 14D:
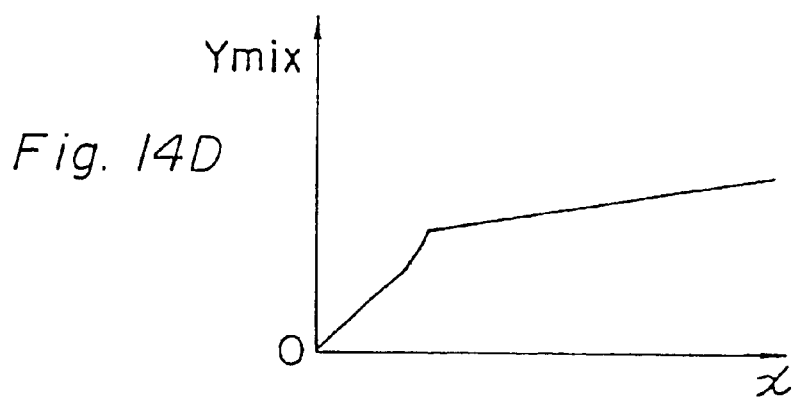
Figure 15:
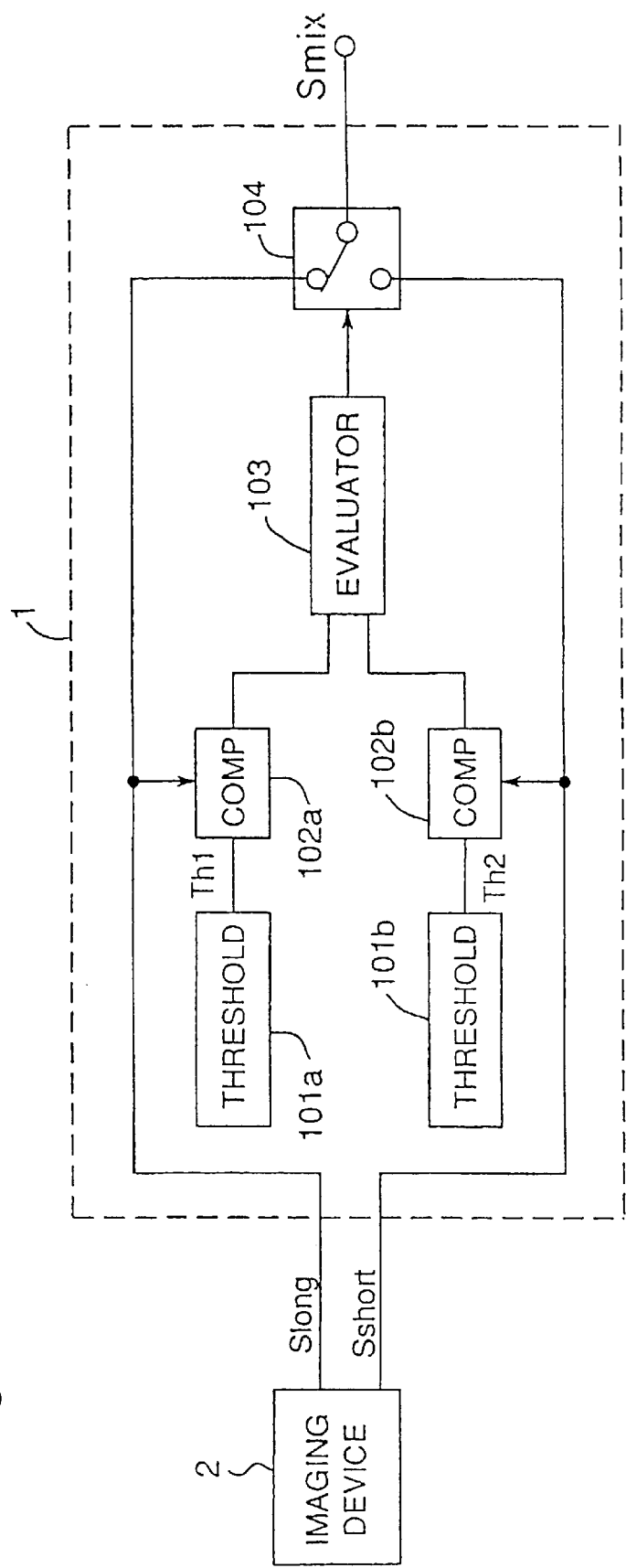
FIG. 15 is a block diagram of a conventional image mixing circuit.
Figure 16A:
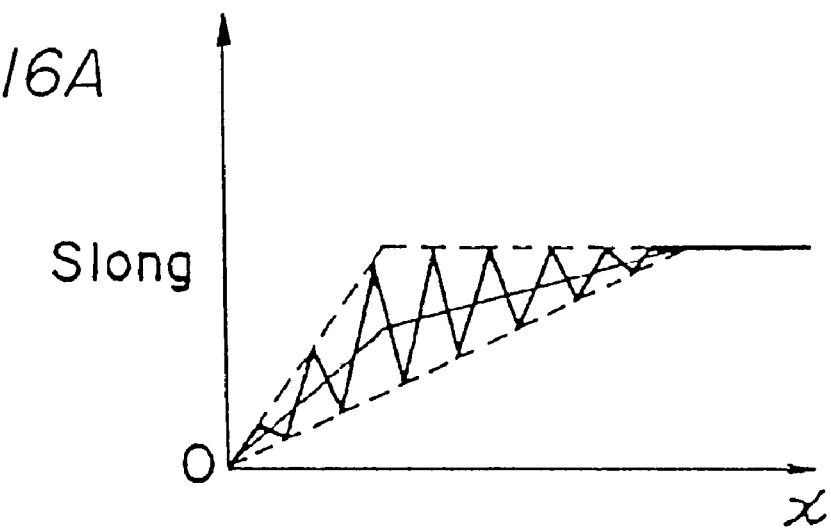
FIG. 16 is a waveform diagram of the input and output signals of a conventional image mixing circuit.
Figure 16B:
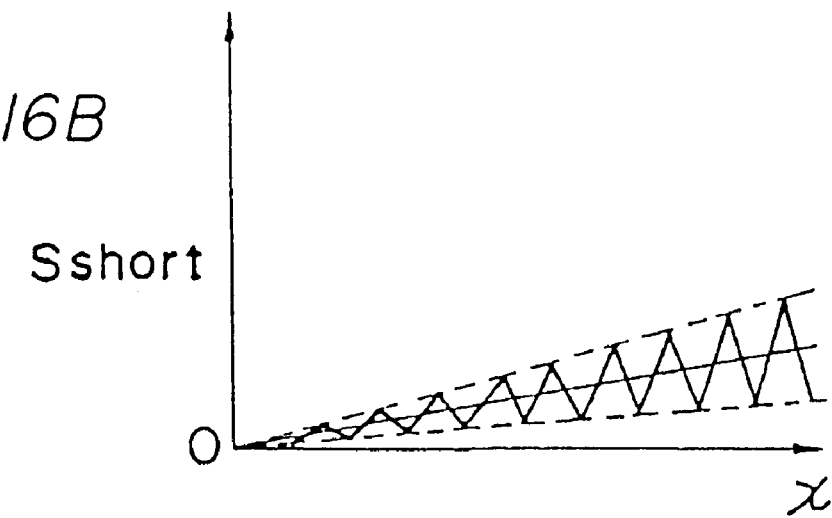
Figure 16C:
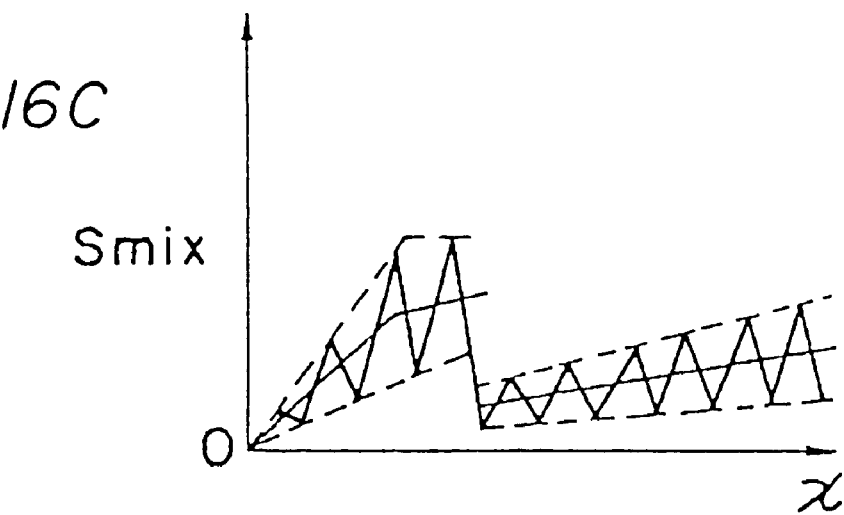

FIG. 13 is a block diagram of the luminance signal mixing circuit 5 in an image mixing circuit according to the fifth embodiment of the present invention.

The construction and operation of the components of the image mixing circuit according to this fifth embodiment are identical to those of the second embodiment described above with the exception of the luminance signal mixing circuit 5. Further description thereof is thus omitted below.

The adder 15c of the luminance signal mixing circuit 5 in this embodiment adds a constant value to the input short-exposure luminance component Yshort to obtain Yshort'. The subsequent operation is identical to that of the luminance signal mixing circuit 5 in the first embodiment above.

The waveforms of Ylong, Yshort, Yshort', and Ymix in this embodiment are shown in FIG. 14.

It is therefore possible by means of this fifth embodiment of an image mixing circuit according to the present invention to apply an image signal mixing process whereby a continuous gradation characteristic in the luminance signal component is achieved, and the signal-to-noise ratio degradation is small, by generating one of the signals used for the luminance signal mixing operation of the luminance signal mixing circuit by simply adding an offset value to plural signals with different exposure levels.

As described above, it is possible by means of the first embodiment of the invention to separate the plural image signals into plural luminance signal components and plural color signal components, to generate the control signal needed for image mixing from the plural image signals, and then separately mix the plural luminance signal components and color signal components according to the control signal to achieve continuous gradation in the luminance signal component and color signal component of the synthesized image signal.

It is further possible by means of the second embodiment of the invention to achieve a continuous gradation characteristic in the color signal component even when gradation correction is applied to the luminance signal by normalizing the color signal component based on the luminance signal component in the color separation circuit, and then weighting the color signal component according to the luminance signal after the mixing process of the color signal mixing circuit is completed.

It is further possible by means of the third embodiment of the invention to apply an image signal mixing process whereby a continuous gradation characteristic in the color signal component and the luminance signal component is achieved while suppressing interline differences in the luminance signal level by generating a color signal using the signal with the highest luminance level selected from the signals with a superposed color signal component in the vicinity of a particular target pixel.

It is further possible by means of the fourth embodiment of the invention to achieve a continuous gradation characteristic in the luminance signal component with little signal-to-noise ratio degradation by generating one of the signals used for the luminance signal mixing operation of the luminance signal mixing circuit by simply adding plural signals with different exposure levels.

It is further possible by means of the fifth embodiment of the invention to achieve a continuous gradation characteristic in the luminance signal component with little signal-to-noise ratio degradation by generating one of the signals used for the luminance signal mixing operation of the luminance signal mixing circuit by adding an offset value to plural signals with different exposure levels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image mixing circuit for mixing a plurality of image signals of different exposure levels comprising:
    an image device for producing at least first and second image signals of different exposure levels;
    a color separation circuit for separating the first image signal into a first luminance signal and a first color signal, and for separating the second image signal into a second luminance signal and a second color signal;
    a control signal generation circuit for generating a control signal necessary for image mixing from at least one of the first and second image signals;
    a luminance signal mixing circuit for mixing the first and second luminance signals according to the control signal; and
    a color signal mixing circuit for mixing the first and second color signals according to the control signal;
    wherein said luminance signal mixing circuit controls a weight of mixing the first and second luminance signals, and wherein said color signal mixing circuit controls a weight of mixing the first and second color signals;
    wherein said imaging device generates an image signal in which a color signal is superposed on a luminance signal as a modulation component;
    wherein said color separation circuit comprises a normalizing circuit for normalizing the color signal according to the luminance signal; and
    wherein said color signal mixing circuit comprises a weighting circuit for weighting the color signal according to the luminance signal afer the color signal mixing operation is completed.

2. An image mixing circuit for mixing a plurality of image signals of different exposure levels comprising:
    an image device for producing at least first and second image signals of different exposure levels;
    a color separation circuit for separating the first image signal into a first luminance signal and a first color signal, and for separating the second image signal into a second luminance signal and a second color signal;
    a control signal generation circuit for generating a control signal necessary for image mixing from at least one of the first and second image signals;
    a luminance signal mixing circuit for mixing the first and second luminance signals according to the control signal; and
    a color signal mixing circuit for mixing the first and second color signals according to the control signal;
    wherein said luminance signal mixing circuit controls a weight of mixing the first and second luminance signals, and wherein said color signal mixing circuit controls a weight of mixing the first and second color signals;
    wherein said imaging device generates an image signal in which a color signal is superposed on a luminance signal as a modulation component; and
    wherein said control signal generation circuit generates the control signal using a signal with a highest luminance level selected from signals with a superposed color signal component in a vicinity of a predetermined target pixel.

3. An image mixing circuit for mixing a plurality of image signals of different exposure levels comprising:
    an image device for producing at least first and second image signals of different exposure levels;
    a color separation circuit for separating the first image signal into a first luminance signal and a first color signal, and for separating the second image signal into a second luminance signal and a second color signal;
    a control signal generation circuit for generating a control signal necessary for image mixing from at least one of the first and second image signals;
    a luminance signal mixing circuit for mixing the first and second luminance signals according to the control signal; and
    a color signal mixing circuit for mixing the first and second color signals according to the control signal;

wherein said luminance signal mixing circuit controls a weight of mixing the first and second luminance signals, and wherein said color signal mixing circuit controls a weight of mixing the first and second color signals; and wherein said luminance signal mixing circuit comprises an offset value adder for adding an offset value to at least one of the first and second luminance signals.

* * * * *